Patented June 6, 1950

2,510,284

UNITED STATES PATENT OFFICE 2,510,284

ETHYLENE OXIDE CONDENSATES OF ETHANOL ROSIN AMINES

Homer H. Haggard, Wilmington, Del., assignor to Hercules Powder Company, Wilmington, Del., a corporation of Delaware No Drawing. Application December 18, 1948, Serial No. 66,146

22 Claims. (Cl. 260—100)

This invention relates to ethylene oxide condensates of ethanol rosin amines and to the method for their preparation.

The condensation of rosin amine with ethylene oxide to produce waxlike water dispersible compositions is known in the art. In the prior art processes the larger the amount of ethylene oxide added to the rosin amine the more waxlike and harder the compositions become. The chemical composition of these waxlike condensates is indefinite and has not been definitely established, but they are known to contain free rosin amine as well as waxlike polyethylene glycol ethers.

Now in acordance with this invention, ethylene oxide condensates of ethanol rosin amine are produced as oily fluids free of waxlike properties and highly homogeneous in composition by first converting a rosin amine into an ethanol rosin amine and subsequently condensing the ethanol rosin amine with ethylene oxide in the presence of a catalyst.

In the process of this invention, the rosin amine is converted into an ethanol rosin amine preferably by condensing the rosin amine with ethylene oxide in the presence of a volatile aliphatic alcohol and in the absence of catalysts. If equimolecular proportions of rosin amine and ethylene oxide are condensed in the presence of a volatile aliphatic alcohol, the product is a monoethanol rosin amine. If two moles of ethylene oxide are similarly added per mole rosin amine, the product is a diethanol rosin amine. In the absence of catalysts, condensation does not proceed beyond the formation of diethanol rosin amine. Since the rate of reaction of ethylene oxide with the first amino hydrogen of the rosin amine is much higher than for reaction with the second, and the reaction can be stopped when both amino hydrogens have reacted, it is possible to prepare either mono- or diethanol rosin amine substantially free of the other.

The condensation of either mono- or diethanol rosin amine with ethylene oxide to form the ethylene glycol ether of the ethanol rosin amine may be carried out directly on the products of condensation of the rosin amine with ethylene oxide by first removing the volatile alcohol, and then add'ng a catalyst and ethylene oxide with or without inert solvents at a suitable reaction temperature. The resulting product will be a derivative of monoethanol rosin amine or diethanol rosin amine depending upon the starting material. Monoethanol rosin amine for example reacts with ethylene oxide in the presence of a catalyst preferentially through the hydrogen on the oxygen rather than that on the nitrogen and the product is an ethylene glycol ether of monoethanol rosin amine, the hydrogen on the nitrogen remaining largely unreacted. Diethanol rosin amines react with ethylene oxide through hydrogens on both hydroxyl groups of the ethanol radicals.

The condensates of ethanol rosin amines with ethylene oxide produced in accordance with this invention are clear oily fluids, the fluidity of which increases as the amount of ethylene oxide combined therewith is increased. None of the ethylene oxide condensates of ethanol rosin amine of this invention are waxlike solids.

The following examples are illustrative of the ethylene oxide condensates of diethanol rosin amines of this invention and the manner in which they are prepared.

Example I

Diethanol dehydrogenated rosin amine was prepared by adding ethylene oxide to an alcoholic solution of dehydrogenated rosin amine at 65° C. until no further ethylene oxide was absorbed. The diethanol dehydrogenated rosin amine was freed of alcohol by heating to 152° C. in vacuo until no more solvent was evolved and 872 parts of this diethanol dehydrogenated rosin amine was charged into an autoclave with 10 parts sodium methoxide. After displacing the air in the autoclave with nitrogen, the autoclave was sealed and heated to 120° C. with agitation. Ethylene oxide was then added until pressure reached about 80 p. s. i. and each time the pressure dropped to 20-25 p. s. i. the pressure was again raised to about 80 p. s. i. The autoclave was heated during this time gradually to 150° C. and the ethylene oxide pressure was raised to 80-130 p. s. i. After 30 hours' reaction with ethylene oxide the excess ethylene oxide was removed and the product weighed. The crude product including the added catalyst amounted to 1480 parts by weight corresponding to a condensate of diethanol rosin amine with about 6 moles ethylene oxide. This product was a fluid of about the viscosity of rosin oil.

Example II

Monoethanol rosin amine was made by slowly adding 140 parts ethylene oxide dissolved in 1000 parts ethyl alcohol to 1000 parts dehydrogenated rosin amine in 1000 parts ethyl alcohol. The temperature rose from an initial 24° C. to a final 45° C. during the gradual combination of the two solutions. After the reaction was complete the alcohol was distilled off, the last being taken off under reduced pressure while heating to 150° C. The monoethanol dehydrogenated rosin amine, chiefly monoethanoldehydroabietylamine, obtained as a pale amber clear viscous fluid residue amounted to 1139 parts by weight.

To the above monoethanol dehydrogenated rosin amine was added 10 parts sodium methoxide. The mixture was heated to 125° C. and ethylene oxide was bubbled slowly into the fluid mixture until the weight of the reaction product had increased to 2125 parts indicating that 980 parts ethylene oxide had been combined with the monoethanol dehydrogenated rosin amine. This product corresponded to a condensate having about 7 moles ethylene oxide per mole monoethanol dehydrogenated rosin amine. After cooling to room temperature it was a thin oily fluid having a neutral equivalent of 607 when dissolved in acetic acid and titrated to an electrometrically determined end point with p-toluenesulfonic acid, and having a neutral equivalent of 1166 when a weighed sample of the condensate was acetylated with acetic anhydride and then dissolved in acetic acid and titrated with p-toluenesulfonic acid to an electrometrically determined end point. The acetylation with acetic anhydride converts the basic >N—H group to a less basic >N—COCH₃ group and the above titrations thus indicate the presence of the >NH group. In the absence of an >NH group the acetylation does not change the neutral equivalent. The difference between the two neutral equivalents is indicative of the presence of an >NH group in the product.

*Example III*

Diethanol dehydrogenated rosin amine was prepared by reacting 280 parts ethylene oxide dissolved in 1000 parts ethyl alcohol with 1000 parts dehydrogenated rosin amine dissolved in 1000 parts ethyl alcohol in the manner described in Example II. The reaction was completed by maintaining a temperature of 45° C. for one hour after the temperature ceased to rise spontaneously. The diethanol dehydrogenated rosin amine recovered by distilling off the solvent amounted to 1275 parts by weight. This crude diethanol dehydrogenated rosin amine had a neutral equivalent of 390 when dissolved in acetic acid and titrated with p-toluenesulfonic acid, and a neutral equivalent of 429 when acetylated with acetic anhydride and then dissolved in acetic acid and titrated with p-toluenesulfonic acid.

To this diethanol dehydrogenated rosin amine heated at 125° C. to form a clear amber liquid was added 10 parts sodium methoxide. Ethylene oxide was then slowly bubbled into the liquid until the weight of the reaction mixture had increased to 2125 parts indicating that 840 parts ethylene oxide had been combined with the diethanol dehydrogenated rosin amine. This product corresponded to an ethylene oxide condensate of diethanol dehydroabietylamine having 6 moles combined ethylene oxide. After cooling to room temperature it was a thin oily fluid.

*Example IV*

Diethanol dehydrogenated rosin amine was made by adding ethylene oxide to dehydrogenated rosin amine in ethyl alcohol solution without any catalyst at 40—78° C. and subsequently distilling off the alcohol. To 631 parts of this diethanol dehydrogenated rosin amine was added 5 parts sodium methoxide. The mixture was heated to 130° C. and ethylene oxide was then bubbled in at atmospheric pressure at such a rate that the temperature was held within the range 130–158° C. for 9.5 hours. The gain in weight due to absorption of ethylene oxide was 1130 parts. This product of condensation of diethanol rosin amine with ethylene oxide was a fluid of about the viscosity of rosin oil.

*Example V*

Example IV was repeated and samples were taken after the absorption of 2, 4, 6, 8 and 18 moles ethylene oxide per mole diethanol dehydrogenated rosin amine. Although diethanol dehydrogenated rosin amine is a balsamlike fluid, the ethylene oxide condensates thereof, regardless of the amount of ethylene oxide introduced, were all much less viscous fluids resembling rosin oil. Moreover, the fluids appeared to be much less viscous the greater the amount of ethylene oxide introduced.

*Example VI*

The ethylene oxide condensate of diethanol hydrogenated rosin amine was made in accordance with the procedure of Example IV by reacting diethanol hydrogenated rosin amine with six molecular proportions of ethylene oxide. It was a nonwaxy clear fluid.

While the ethylene oxide condensates of ethanol rosin amines of this invention may be made from an ethanol rosin amine produced in any known manner, the ethanol rosin amines are most satisfactorily made by the reaction of a rosin amine with ethylene oxide in the absence of an alkaline catalyst. In which case, the rosin amine is first treated with ethylene oxide in the presence of a volatile aliphatic alcohol and then the alcohol is removed, an alkaline catalyst is added, and the treatment with ethylene oxide is continued.

In the reaction of rosin amine with ethylene oxide in the presence of an aliphatic alcohol the initial product appears to be a monoethanol rosin amine of the general formula

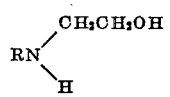

where R is abietyl, dihydroabietyl, tetrahydroabietyl, or dehydroabietyl corresponding with the organic radical of the rosin amine from which it was produced.

The diethanol rosin amines made by reacting a rosin amine with two moles ethylene oxide in an alcohol solution or by reacting a monoethanol rosin amine with another mole exthylene oxide in an alcohol solution have the general formula

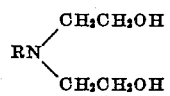

where R is abietyl, dihydroabietyl, tetrahydroabietyl or dehydroabietyl corresponding with the organic radical of the rosin amine from which the diethanol rosin amine is produced.

The ethylene oxide condensates of monoethanol rosin amines produced from monoethanol rosin amines are believed to have the general formula

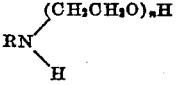

where R is the organic radical of the monoethanol rosin amine which was used in the preparation and is one of the organic radicals listed in the preceding paragraph and $n$ is an integer from 2 to about 20.

The ethylene oxide condensates of diethanol rosin amine produced by the reaction of diethanol rosin amines of the above general formula with ethylene oxide in the presence of a catalyst are believed to have the following general formula

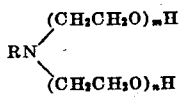

where R is one of the organic radicals listed in the next to the last preceding paragraph and $m$ and $n$ are integers from 2 to about 10, the sum of which does not exceed about 20.

The volatile alcohols which are used in the reaction to form ethanol rosin amine are any of the aliphatic alcohols which may be readily removed from the product by distillation. The preferred alcohols are those with four or less carbon atoms such as methyl, ethyl, propyl, isopropyl, and butyl alcohols. The alcohol may be present in amounts molecularly equal to or greater than the rosin amine. It is preferred, however, to use the alcohol as a solvent in sufficient amounts to produce fluidity. The alcohols should not be present in the second step of reaction of the ethanol rosin amine with ethylene oxide in the presence of an alkaline catalyst.

The catalysts which are used to promote the reaction of the ethanol rosin amines with ethylene oxide are the alkaline compounds: sodium hydroxide, sodium acetate, sodium carbonate, sodium alkoxides, such as sodium methoxide, sodium ethoxide, etc., and the corresponding potassium compounds and their equivalents. Usually 1–2% catalyst is used based on the ethanol rosin amine, but as little as 0.5% and as much as 5% may equally well be used.

Solvents in which the condensation of ethylene oxide with the ethanol rosin amines may be carried out include those solvents which react with neither the amine nor the ethylene oxide. This includes hydrocarbons, especially the aromatic hydrocarbon solvents such as benzene, toluene, xylene and cymene which are preferred, and petroleum solvents rich in such aromatics.

The temperature of condensation of ethylene oxide with the ethanol rosin amines in the presence of a catalyst may be anywhere within the range of about 80°–200° C. but it is preferably within the range of about 120°–180° C. The condensation may be carried out either at atmospheric pressure or elevated pressure.

The rosin amines from which the diethanol rosin amines are prepared are the rosin amines which are prepared by reacting ammonia with a natural rosin or a modified rosin to form the nitrile from the carboxyl group in the rosin and then hydrogenating the rosin nitrile or modified rosin nitrile to form the amine. The preparation of the nitrile may be carried out by passing gaseous ammonia into the molten rosin material and vaporizing the water as fast as it is formed in order to remove the water from the reaction mixture. Dehydration catalysts may be used to facilitate the reaction with ammonia, if desired. The nitrile is preferably purified by neutralization or distillation to make it suitable for hydrogenation to the amine as the presence of acidic materials frequently destroys the hydrogenation catalyst. The nitrile may be formed from any natural rosin or modified rosin such as gum rosin, wood rosin, hydrogenated rosin, dehydrogenated or disproportionated rosin, or heat-treated rosin. The rosin nitriles may likewise be made from the rosin acids which are major constituents of these rosins such as abietic acid, dihydroabietic acid, dehydroabietic acid, and tetrahydroabietic acid.

The resin acid nitriles prepared from the natural or modified rosins or the corresponding rosin acids are readily hydrogenated to the amines. The hydrogenation is usually carried out by heating the rosin nitrile at about 150° to 200° C. with a Raney nickel catalyst under hydrogen pressure up to about 8000 lb./sq. in. The hydrogenation may also be carried out using other catalysts such as Raney cobalt, supported nickel or cobalt catalysts and noble metal catalysts such as platinum, palladium, palladium on carbon, or reduced platinum oxide. The reaction may be carried out under hydrogen pressure of from about 200 to 8000 lb./sq. in. and at a temperature of from about 20° to 200° C. Solvents may be used, if desired, and are preferable at the lower temperatures. The hydrogenation may also be carried out in the presence or absence of ammonia. Although the hydrogenation is ordinarily carried out only to the extent of hydrogenation of the nitrile group which hydrogenates quite readily, the hydrogenation may also be carried out under such conditions of temperature, pressure, and time of hydrogenation as to hydrogenate the rosin amines which are produced to convert them to hydrorosin amines which correspond to the amines produced from hydrogenated rosin via the nitriles.

The term "rosin amine" is used in this specification and claims to include broadly the primary amines derived from various rosins or rosin acids in the manner indicated whereby the carboxyl of the rosin or rosin acid is converted into a —CH$_2$NH$_2$ group. Rosin amines included within this scope are gum and wood rosin amines, derived respectively from gum and wood rosin and containing chiefly abietylamine; dehydrogenated rosin amine derived from dehydrogenated rosin and containing chiefly dehydroabietylamine; hydrorosin amine derived from hydrogenated gum or wood rosin and containing chiefly dihydro- and tetrahydroabietylamine; heat treated rosin amine derived from heat treated rosin; polymerized rosin amine derived from polymerized rosin; isomerized rosin amine derived from isomerized rosin and containing substantial amounts of abietylamine; and the rosin amines derived from the pure rosin acids, namely, abietylamine, dihydroabietylamine, dehydroabietylamine and tetrahydroabietylamine.

The ethylene oxide condensates of ethanol rosin amines of this invention may be used as corrosion inhibitors in either the dissolved or dispersed state in aqueous solutions. They are more soluble in the aqueous than in the oil phase of two-phase systems. When products having about 6 to about 18 moles of ethylene oxide combined with the ethanol rosin amine are used, they dissolve or disperse readily in aqueous solutions without producing any cloudiness and they may be used in acid, neutral or basic solutions. The ethylene oxide condensates of ethanol rosin amine are homogeneous and contain no free rosin amine or waxy polyethylene glycol such as do ethylene oxide rosin amine condensates of the prior art. The products are as a result free of the skin irritant characteristics of the rosin amines. They are also superior in their utility as leveling agents in dyeing with acid dyes for the same reason.

What I claim and desire to protect by Letters Patent is:

1. The method of producing an ethylene oxide condensate of an ethanol rosin amine which comprises causing an N-ethanol rosin amine in which no ethanol group is substituted to react with 2 to 18 moles ethylene oxide in the presence of an alkaline catalyst at a temperature within the range of about 80–200° C.

2. The method of producing an ethylene oxide condensate of a monoethanol rosin amine which comprises causing an N-monoethanol rosin amine in which no ethanol group is substituted to react with 2 to 19 moles ethylene oxide in the presence of an alkaline catalyst at a temperature within the range of about 80–200° C.

3. The method of producing an ethylene oxide condensate of a diethanol rosin amine which comprises causing an N-diethanol rosin amine in which no ethanol group is substituted to react with 2 to 18 moles ethylene oxide in the presence of an alkaline catalyst at a temperature within the range of about 80–200° C.

4. The method of producing an ethylene oxide condensate of a diethanol dehydrogenated rosin amine which comprises causing an N-diethanol dehydrogenated rosin amine in which no ethanol group is substituted to react with 2 to 18 moles ethylene oxide in the presence of an alkaline catalyst at a temperature within the range of about 80–200° C.

5. The method of producing an ethylene oxide condensate of diethanoldehydroabietylamine which comprises causing N,N-diethanoldehydroabietylamine to react with 2 to 18 moles ethylene oxide in the presence of an alkaline catalyst at a temperature within the range of about 80–200° C.

6. The method of producing an ethylene oxide condensate of a diethanol hydrorosin amine which comprise causing an N-diethanol hydrorosin amine in which no ethanol group is substituted to react with 2 to 18 moles ethylene oxide in the presence of an alkaline catalyst at a temperature within the range of about 80–200° C.

7. The method of producing an ethylene oxide condensate of a diethanol dihydrorosin amine which comprises causing an N-diethanol dihydrorosin amine in which no ethanol group is substituted to react with 2 to 18 moles ethylene oxide in the presence of an alkaline catalyst at a temperature within the range of about 80–200° C.

8. The method of producing an ethylene oxide condensate of a diethanol tetrahydrorosin amine which comprises causing an N-diethanol tetrahydrorosin amine in which no ethanol group is substituted to react with 2 to 18 moles ethylene oxide in the presence of an alkaline catalyst at a temperature within the range of about 80–200° C.

9. The method of producing an ethylene oxide condensate of diethanoldihydroabietylamine which comprises causing N,N-diethanoldihydroabietylamine to react with 2 to 18 moles ethylene oxide in the presence of an alkaline catalyst at a temperature within the range of about 80–200° C.

10. The method of producing an ethylene oxide condensate of a monoethanol dehydrogenated rosin amine which comprises causing an N-monoethanol dehydrogenated rosin amine in which no ethanol group is substituted to react with 2 to 19 moles ethylene oxide in the presence of an alkaline catalyst at a temperature within the range of about 80–200° C.

11. The method of producing an ethylene oxide condensate of a monoethanoldehydroabietylamine which comprises causing N-monoethanoldehydroabietylamine to react with 2 to 19 moles ethylene oxide in the presence of an alkaline catalyst at a temperature within the range of about 80–200° C.

12. The method of producing an ethylene oxide condensate of a monoethanoldehydroabietylamine which comprises causing dehydroabietylamine to react with one mole ethylene oxide in the presence of a volatile aliphatic alcohol to form N-monoethanoldehydroabietylamine, removing said alcohol, and subsequently causing the N-monoethanoldehydroabietylamine produced to react with 2 to 19 moles ethylene oxide in the presence of an alkaline catalyst at a temperature within the range of about 80–200° C.

13. The method of producing an ethylene oxide condensate of a diethanoldehydroabietylamine which comprises causing dehydroabietylamine to react with 2 moles ethylene oxide in the presence of a volatile aliphatic alcohol to form N,N-diethanoldehydroabietylamine, removing said alcohol, and subsequently causing the N,N-diethanoldehydroabietylamine to react with 2 to 18 moles ethylene oxide in the presence of an alkaline catalyst at a temperature within the range of about 80–200° C.

14. A clear liquid nonwaxy product of condensation at 80–200° C. of an ethanol amine selected from the group consisting of N-monoethanolabietylamine, N-monoethanoldihydroabietylamine, N-monoethanoltetrahydroabietylamine, N-monoethanoldehydroabietylamine, N,N-diethanolabietylamine, N,N-diethanoldihydroabietylamine, N,N-diethanoltetrahydroabietylamine, and N,N-diethanoldehydroabietylamine with 2 to 18 molecular proportions of ethylene oxide.

15. A clear liquid nonwaxy product of condensation at 80–200° C. of N-monoethanoldehydroabietylamine and 2 to 19 molecular proportions of ethylene oxide.

16. A clear liquid nonwaxy product of condensation at 80–200° C. of N,N-diethanoldehydroabietylamine and 2 to 18 molecular proportions of ethylene oxide.

17. A clear liquid nonwaxy product of condensation at 80°–200° C. of an N-ethanol rosin amine in which no ethanol group is substituted and 2 to 18 molecular proportions of ethylene oxide.

18. A clear liquid nonwaxy product of condensation at 80°–200° C. of an N-ethanol dehydrogenated rosin amine in which no ethanol group is substituted and 2 to 18 molecular proportions of ethylene oxide.

19. A clear liquid nonwaxy product of condensation at 80°–200° C. of an N-ethanol hydrogenated rosin amine in which no ethanol group is substituted and 2 to 18 molecular proportions of ethylene oxide.

20. A clear liquid nonwaxy product of a two-step condensation of a rosin amine with up to 20 molecular proportions of ethylene oxide, 1 to 2 molecular proportions of ethylene oxide being condensed with the rosin amine in the absence of a catalyst in the first step, and 2 to 18 molecular proportions of ethylene oxide being condensed at 80–200° C. in the presence of a catalyst in the second step.

21. A clear liquid nonwaxy product of a two-step condensation of dehydrogenated rosin amine with up to 20 molecular proportions of ethylene oxide, 1 to 2 molecular proportions of ethylene oxide being condensed with the dehydrogenated rosin amine in the absence of a catalyst in the first step, and 2 to 18 molecular proportions of ethylene oxide being condensed at 80°–200° C. in the presence of a catalyst in the second step.

22. A clear liquid nonwaxy product of a two-step condensation of hydrogenated rosin amine with up to 20 molecular proportions of ethylene oxide, 1 to 2 molecular proportions of ethylene oxide being condensed with the hydrogenated rosin amine in the absence of a catalyst in the first step, and 2 to 18 molecular proportions of ethylene oxide being condensed at 80°–200° C. in the presence of a catalyst in the second step.

HOMER H. HAGGARD.

REFERENCES CITED

The following references are of record in the file of this patent:

UNITED STATES PATENTS

| Number | Name | Date |
| --- | --- | --- |
| 2,194,429 | Krzikalla | Mar. 19, 1940 |